US009866610B2

(12) United States Patent
Poulin

(10) Patent No.: US 9,866,610 B2
(45) Date of Patent: Jan. 9, 2018

(54) METHODS, SYSTEMS, AND COMPUTER READABLE MEDIA FOR SELECTING A CODEC PAIR BASED ON NETWORK CONDITIONS

(75) Inventor: Eric Poulin, Pierrefonds (CA)

(73) Assignee: GENBAND US LLC, Plano, TX (US)

( * ) Notice: Subject to any disclaimer, the term of this patent is extended or adjusted under 35 U.S.C. 154(b) by 1088 days.

(21) Appl. No.: 13/329,200

(22) Filed: Dec. 16, 2011

(65) Prior Publication Data

US 2013/0156119 A1     Jun. 20, 2013

(51) Int. Cl.
*H04L 12/28*     (2006.01)
*H04L 29/06*     (2006.01)

(52) U.S. Cl.
CPC .................. *H04L 65/80* (2013.01)

(58) Field of Classification Search
CPC . H04L 41/5009; H04L 65/80; H04L 41/5087; H04L 5/1438; H04L 12/2602; H04L 43/00; H04M 3/2227; H04W 88/181; H04W 76/022
See application file for complete search history.

(56) References Cited

U.S. PATENT DOCUMENTS 6,961,315 B1 * 11/2005 Amster et al. ............... 370/252
7,768,998 B1 * 8/2010 Everson et al. ............. 370/352
2002/0184131 A1 * 12/2002 Gatto .............................. 705/36
2003/0091034 A1 * 5/2003 Koistinen ..................... 370/352
2007/0165644 A1 * 7/2007 Rossler ...................... 370/395.2
2007/0274236 A1 * 11/2007 Araki ............................ 370/260
2008/0192760 A1 * 8/2008 Baeder et al. ............... 370/401
2009/0154658 A1 * 6/2009 Kasper et al. ............ 379/32.01
2009/0238085 A1 * 9/2009 Khanduri ..................... 370/252
2010/0070286 A1 * 3/2010 Kampmann et al. ......... 704/500
2010/0161325 A1 * 6/2010 Hellwig et al. .............. 704/229
2010/0238834 A9 * 9/2010 Awais ........................... 370/253

* cited by examiner

*Primary Examiner* — Melanie Jagannathan
(74) *Attorney, Agent, or Firm* — Fogarty LLP

(57) ABSTRACT

A method for selecting a codec pair includes obtaining a first performance metric indicating a condition of a first network connected to the network node via a first communication interface, the first network including a first endpoint. A second performance metric indicating a condition of a second network connected to the network node via a second communication interface is obtained. The second network includes a second endpoint. A codec selection model is generated or updated based on the first and second performance metrics. A first codec is selected from a plurality of codecs compatible with the first endpoint based on the codec selection model. A second codec is selected from a plurality of codecs compatible with the second endpoint based on the codec selection model. The first and second codecs are used to communicate a portion of a communication session between the first endpoint and the second endpoint.

23 Claims, 5 Drawing Sheets

METHODS, SYSTEMS, AND COMPUTER READABLE MEDIA FOR SELECTING A CODEC PAIR BASED ON NETWORK CONDITIONS

TECHNICAL FIELD

The subject matter described herein relates to selecting a codec pair based on network conditions. More specifically, the subject matter relates to methods, systems, and computer readable media for selecting a codec pair based on network conditions.

BACKGROUND

Digital communications networks employ various codecs when encoding a signal for transmission. The particular codec utilized is often a function of the nature of the underlying information, the encoding device's capabilities, and the required level of quality of service (QoS). A typical digital mobile telephone handset, for example, will encode a signal using a codec that is optimized for telephone conversations supported by the handset and capable of providing a sufficient level of QoS. Ideally, the codec utilized is also compatible with the network hardware required to complete the call. Often, however, the codec utilized by the encoding endpoint is not supported by the destination endpoint and/or network hardware that must be traversed en route to the destination endpoint. For example, a call may be placed from an endpoint in one provider's network to an endpoint in a different provider's network. Each of the providers may utilize different codecs for encoding calls. Such a scenario necessitates the use of a transcoder to decode the signal from the originating endpoint's selected codec and then re-encode the signal using the destination endpoint's selected codec.

Codecs are designed with specific performance requirements in mind and their performance may vary dramatically based on the difference between the conditions in which they were designed to operate and actual conditions. For example, while one codec may provide excellent QoS under normal network load, its QoS may decline to unacceptable levels under demanding network conditions. Similarly, another codec may provide relatively acceptable levels of QoS under demanding network conditions, but may fail to provide an excellent level of QoS, even under ideal network conditions. A provider deciding which of the two codecs to employ may have to prioritize reliable service and, in turn, place a relatively low ceiling on the level of QoS that it is able to offer its users.

Accordingly, a need exists for methods, systems, and computer readable media for selecting a codec pair based on network conditions.

SUMMARY

According to one aspect, the subject matter described herein includes a method for selecting a codec pair based on network conditions. The method includes steps occurring at a network node including a first communication interface and a second communication interface. The steps include obtaining a first performance metric indicating a condition of a first network connected to the network node via the first communication interface, the first network including a first endpoint. The steps also include obtaining a second performance metric indicating a condition of a second network connected to the network node via the second communication interface, the second network including a second endpoint. The steps further include generating or updating a codec selection model based on the obtained first performance metric and the obtained second performance metric. The steps further include selecting a first codec from a plurality of codecs compatible with the first endpoint based on the codec selection model. The steps further include selecting a second codec from a plurality of codecs compatible with the second endpoint based on the codec selection model. The steps further include utilizing the first selected codec and the second selected codec to communicate a portion of a communication session between the first endpoint and the second endpoint.

According to another aspect, the subject matter described herein includes a system for selecting a codec pair based on network conditions. The system includes a first communication interface configured to interface with a first network including a first endpoint. The system also includes a second communication interface configured to interface with a second network including a second endpoint. The system further includes a network performance module configured to obtain a first performance metric indicating a condition of the first network and a second performance metric indicating a condition of the second network. The system further includes a codec selection module configured to generate or update a codec selection model based on the obtained first performance metric and the obtained second performance metric, select a first codec from a plurality of codecs compatible with the first endpoint based on the codec selection model, and select a second codec from a plurality of codecs compatible with the second endpoint based on the codec selection model. The system further includes a transcoder configured to utilize the first selected codec and the second selected codec to communicate a portion of a communication session between the first endpoint and the second endpoint.

As used herein, the term "node" refers to a physical computing platform including one or more processors and memory.

As used herein, the terms "function" or "module" refer to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
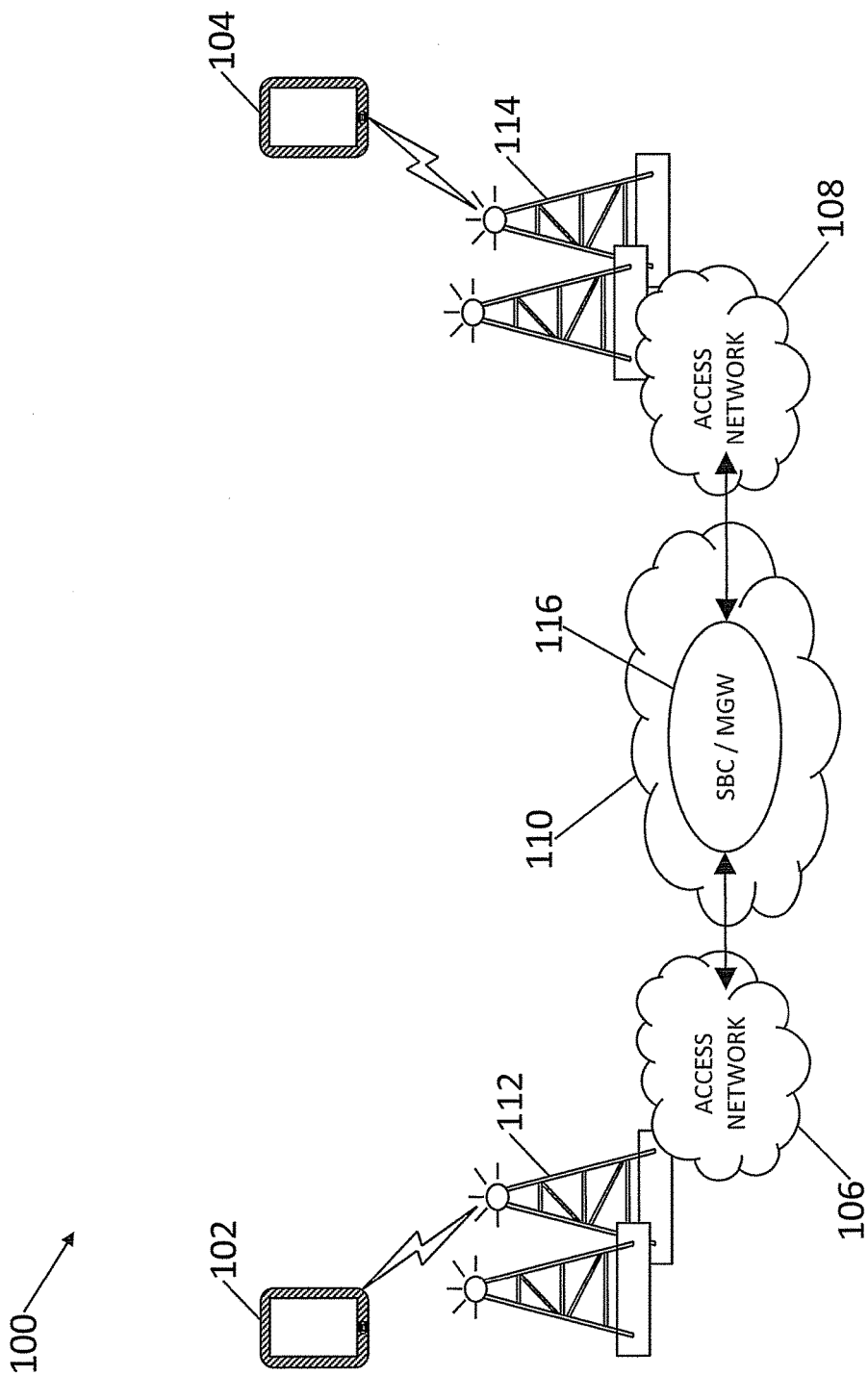
FIG. 1 is a network diagram illustrating an exemplary network environment for selecting a codec pair based on network conditions in accordance with embodiments of the subject matter described herein.

Methods, systems, and computer readable media for selecting a codec pair based on network conditions are provided. FIG. 1 is a network diagram illustrating an exemplary network environment for selecting a codec pair based on network conditions in accordance with embodiments of the subject matter described herein. Referring to FIG. 1, network environment 100 may include one or more user equipment (UE) devices. For example, network environment 100 may include UE 102 and UE 104. UE 102 and/or UE 104 may be any device capable of participating in a communication session. For example, UE 102 and/or UE 104 may be a mobile handset, smartphone, tablet computer, laptop computer, desktop computer, or other device capable of participating in a communication session. Network environment 100 may also include one or more networks. For example, network environment 100 may include access network 106, access network 108, and/or carrier network 110. A network may be any combination of one or more nodes for supporting a communication session. For example, a network may include one or more nodes for supporting a communication session between UE 102 and UE 104. Access network 106 and/or access network 108 may be a wireless access network, such as a cellular communication network and may include one or more transceiver/receiver stations for communicating with one or more UE(s). For example, access networks 106 and 108 may be cellular communication networks and may respectively include transceiver/receiver stations 112 and 114 for respectively communicating with UEs 102 and 104. Carrier network 110 may interface access network 106 and access network 108, and may include one or more nodes for supporting a communication session between UE 102 and UE 104. For example, carrier network 110 may include transcoder node 116. Transcoder node 116 may be configured to transcode a portion of a communication session between UE 102 and UE 104. Transcoder node 116 may be, for example, a session border controller (SBC) and/or a media gateway (MGW). In accordance with embodiments of the subject matter described herein, transcoder node 116 may select a codec pair based on network conditions. For example, transcoder node 116 may select a codec pair to be utilized to communicate a portion of a communication session between UE 102 and UE 104 based on network conditions associated with access network 106, access network 108, and/or carrier network 110.

Figure 2:
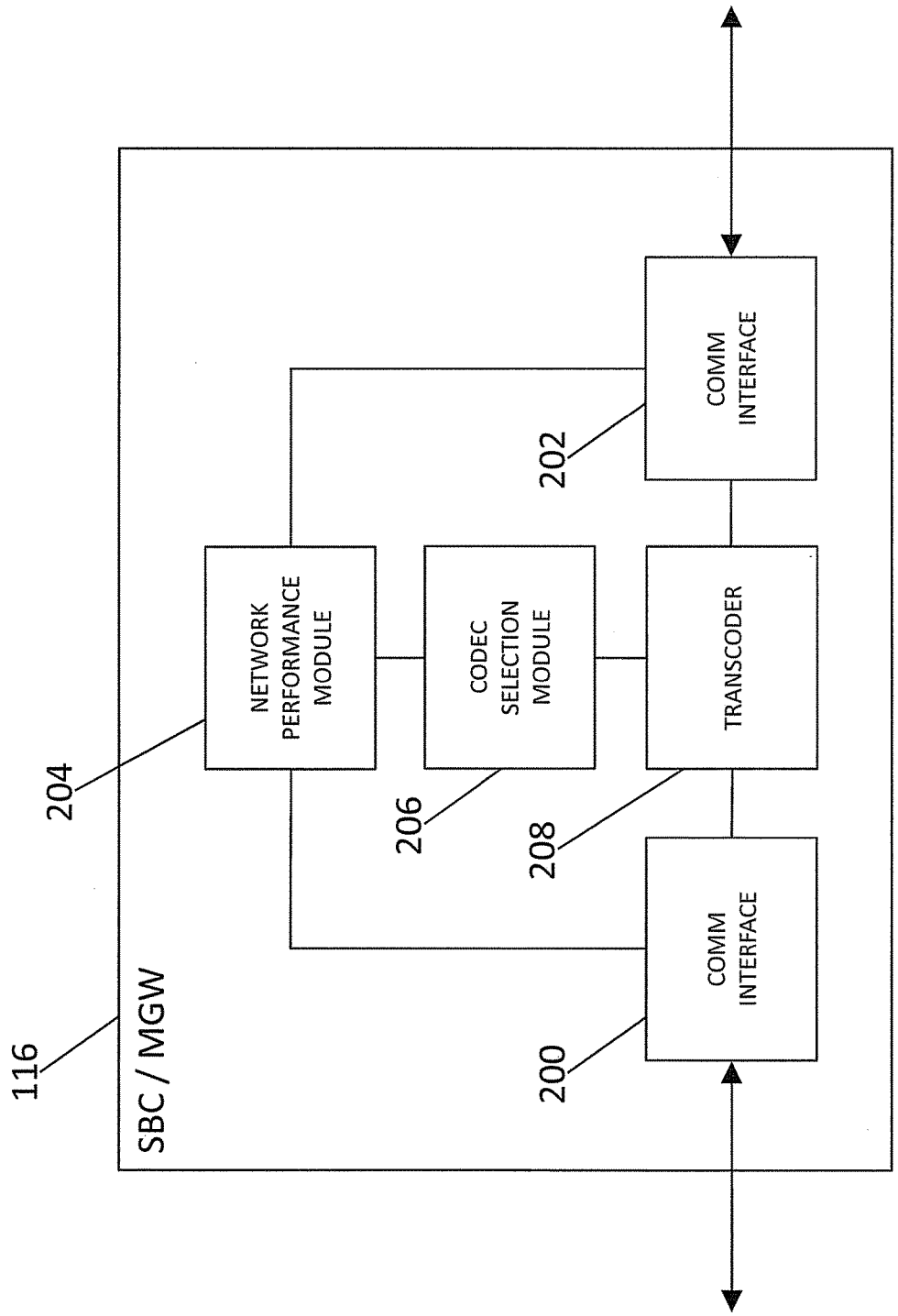
FIG. 2 is a block diagram illustrating an exemplary system for selecting a codec pair based on network conditions in accordance with embodiments of the subject matter described herein.

FIG. 2 is a block diagram illustrating an exemplary system for selecting a codec pair based on network conditions in accordance with embodiments of the subject matter described herein. Referring to FIG. 2, transcoder node 116 may include one or more communication interfaces. For example, transcoder node 116 includes communication interface 200 and communication interface 202. Communication interface 200 and communication interface 202 may be configured to interface with one or more network(s). For example, communication interface 200 may be configured to interface with access network 106 and communication interface 202 may be configured to interface with access network 108. Communication interface 200 and communication interface 202 may be any communication interface capable of supporting a communication session. For example, communication interface 200 and/or communication interface 202 may be a packet interface or a time-division multiplexing (TDM) interface. In some embodiments, communication interface 200 may be a packet interface and communication interface 202 may be a TDM interface. In some embodiments, communication interface 200 and communication interface 202 may both be packet interfaces. Communication interface 200 and communication interface 202 need not consist of two distinct hardware interfaces. For example, communication interface 200 and communication interface 202 may be different facets of a single packet interface card, each facet interfacing with a different network (e.g., access networks 106 and 108).

Transcoder node 116 may also include network performance module 204. Network performance module 204 may be configured to obtain one or more performance metric(s) indicating a condition of one or more networks. For example, network performance module 204 may be configured to obtain a performance metric indicating a condition of access network 106. Similarly, network performance module 204 may be configured to obtain a performance metric indicating a condition of access network 108. Network performance module 204 may be configured to obtain one or more performance metrics. For example, network performance module 204 may be configured to obtain one or more of a measure of packet loss, a measure of end-to-end packet delay, and a measure of jitter. Network performance module 204 may be operative to communicate with communication interface 200 and/or communication interface 202 for obtaining one or more performance metrics. For example, network performance module 204 and/or one or both of communication interface(s) 200 and 202 may include a network probe for obtaining one or more performance metrics. In some embodiments, network performance module 204 may have access to one or more performance metrics from a probe external to transcoder node 116. For example, network performance module 204 may have access to one or more performance metrics associated with access network 106 and/or access network 108 from a probe external to transcoder node 116 via communication interface 200 and/or communication interface 202. In some embodiments, network performance module 204 may access one or more performance metrics using a standardized protocol, such as real-time transport control protocol (RTCP) or RTCP-extended reports (RTCP-XR). RTCP-XR is an extended version of RTCP which may provide access to more extensive information regarding network conditions.

In accordance with embodiments of the subject matter described herein, transcoder node 116 may also include codec selection module 206. Codec selection module 206 may be configured to determine one or more codec(s) that are compatible with one or more endpoint(s) that utilize transcoder node 116. For example, codec selection module 206 may be configured to determine one or more codec(s) compatible with one or more endpoint(s) in access network 106 (e.g., one or more codec(s) compatible with UE 102)

and/or one or more codec(s) compatible with one or more endpoint(s) in access network 108 (e.g., one or more codec(s) compatible with UE 104). In some embodiments, codec selection module 206 may be configured to determine one or more codec(s) compatible with a given endpoint based on a session description protocol (SDP) offer message. In some embodiments, codec selection module 206 may be configured to determine one or more codec(s) compatible with a given endpoint based on pre-configured compatibility information associated with the endpoint.

As described above, codecs are designed with specific performance requirements in mind and their performance may vary dramatically based on the difference between the conditions in which they were designed to operate and actual conditions. Thus, for example, while one codec may perform well under a given set of network conditions, it may fail to provide sufficient QoS under more demanding network conditions. Similarly, while another codec may perform adequately under a relatively wide range of network conditions, it may not perform as well under optimal network conditions. In order to ensure service under most conditions, providers may be forced to use the codec that performs adequately under a wide range of conditions, a decision which may unnecessarily limit QoS under optimal conditions.

In accordance with embodiments of the subject matter described herein, codec selection module 206 may be configured to generate or update a codec selection model based on one or more network condition(s). For example, codec selection module 206 may be configured to generate and/or update a codec selection model based on one or more condition(s) associated with access network 106 and/or one or more condition(s) associated with access network 108. Codec selection module 206 may be operatively associated with network performance module 204 for obtaining information related to such network conditions. For example, codec selection module 206 may obtain from network performance module 204 a performance metric (e.g., a measure of packet loss, a measure of end-to-end packet delay, and/or a measure of jitter) indicating a condition of access network 106. Similarly, codec selection module 206 may obtain from network performance module 204 a performance metric (e.g., a measure of packet loss, a measure of end-to-end packet delay, and/or a measure of jitter) indicating a condition of access network 108. As will be described in greater detail below, codec selection module 206 may utilize these one or more performance metric(s) to generate or update a codec selection model. Having generated or updated the codec selection model to reflect substantially current network conditions (e.g., conditions of access network 106 and/or access network 108), codec selection module 206 may select a first codec from among one or more codec(s) determined to be compatible with an endpoint in access network 106 (e.g., UE 102) and a second codec from among one or more codec(s) determined to be compatible with an endpoint in access network 108 (e.g., UE 104) based on the generated or updated codec selection model. Accordingly, a codec may be selected which is optimal for use under substantially current network conditions in access network 106 and/or access network 108. Transcoder node 116 may also include transcoder 208. Transcoder 208 may be operative to communicate with codec selection module 206 and thus may be informed of the selected codecs by codec selection module 206. Transcoder 208 may be configured to utilize the selected codecs to communicate a portion of a communication session between the two endpoints (e.g., a communication session between UE 102 and UE 104). In some embodiments, the selected codecs may be the same and transcoder 208 may communicate the portion of the communication session between the two endpoints by supporting tandem free operation (TFO). In some embodiments, the selected codecs may be different and transcoder 208 may communicate the portion of the communication session between the two endpoints by transcoding the portion of the communication session from the first selected codec (e.g., the selected codec compatible with UE 102) to the second selected codec (e.g., the selected codec compatible with UE 104).

As indicated above, in accordance with embodiments of the subject matter described herein, codec selection module 206 may be configured to generate and/or update a codec selection model based on one or more network condition(s), for example, one or more network condition(s) associated with access network 106 and/or one or more network condition(s) associated with access network 108. In some embodiments, the codec selection model may be based on the E-model (ITU-T G.107 04/2009), a well-proven computation model that predicts voice quality using, inter alia, one or more network characteristic(s) such as delay, jitter, and packet loss. The codec selection model may be generated for a given communication session by using substantially current network conditions to compute an R-factor for each possible combination of codecs compatible with each endpoint of the communication session. For example, an R-factor can be computed for each combination of codecs that are determined to be compatible with UE 102 and UE 104 based on one or more performance metric(s) associated with access network 106 and/or one or more performance metric(s) associated with access network 108.

An R-factor is a scalar quality rating value which varies directly with overall conversation quality and may be obtained using the following formula:

$$R = Ro - Is - Id - Ie\text{-}eff + A$$

Where:
Ro: represents in principle the basic signal-to-noise ratio (in narrow band, Ro is defaulted to 93.2)
Is: is a combination of all impairments which occur more or less simultaneously with the voice signal
Id: represents the impairments caused by delay and the effective equipment impairment factor
Ie-eff: represents impairments caused by low bit-rate codecs and may also include impairment due to randomly distributed packet loss, but may take packet distribution into account
A: is an advantage factor which allows for compensation of impairment factors when there are other advantages of access to the user The number of performance metrics readily obtainable with respect to a given network may be limited and the computation of a given R-factor may be simplified to take into account such practical limitations. For example, the following formula may be used to compute an R-factor that takes into account delay and jitter (without considering the effect of echo) and the effect of packet loss:

$$R = 93.2 - Id - Ie\text{-}eff$$

Ie-eff corresponds to an effective equipment impairment factor that reflects the effect of packet loss. Ie-eff may be calculated using the following formula:

$$Ie\text{-}eff = Ie + (95 - Ie) \cdot \frac{Ppl}{\frac{Ppl}{BurstR} + Bpl}$$

Where:
Ie: corresponds to an equipment impairment factor
Ppl: corresponds to a packet loss probability
Bpl: corresponds to a packet loss robustness factor
BurstR: corresponds to a burst ratio In some embodiments BurstR may be assumed to equal 1.0, corresponding to a random packet loss distribution. In other embodiments, if an accurate metric (e.g., an RTCP-XR metric) is available, a more accurate BurstR value may be utilized. The Ie value for an element utilizing a low bit-rate codec may depend on opinion score test results and network experience. It may be estimated using a predetermined model derived using codec-specific values for the equipment impairment factor at zero packet loss and the packet loss robustness factor, both of which may be found in Appendix I of ITU-T G.113 (December 1998). For example, Ie can be estimated using a predetermined model, such as the regression-based model described by Lingfen Sun & Emmanuel C. Ifeachor in "Voice Quality Prediction Models and Their Application in VoIP Networks, IEEE Transactions on Multimedia, Vol. 8, No. 4 (August 2006), which discloses a procedure for developing regression-based models that can be used to estimate an Ie value for a given codec at various packet loss rates using perceptual evaluation of speech quality (PESQ). Such a model may be developed for each codec a network component is expected to support.

Id represents the impairment delay caused by too-long absolute delay Ta (assuming perfect echo cancelling). In some embodiments, Id may be estimated using the method described by Rix et al., "Perceptual Evaluation of Speech Quality (PESQ): The New ITU Standard for End-to-End Speech Quality Assessment Part I—Time-Delay Compensation"; JAES Volume 50, Issue 10, pp. 755-764 (October 2002). In some embodiments, Id may be estimated using the following formulas:

For Ta≤100 ms:
Id=0
For Ta>100 ms:

$$Id = 25\left\{(1 + X^6)^{\frac{1}{6}} - 3\left(1 + \left[\frac{X}{3}\right]^6\right)^{\frac{1}{6}} + 2\right\}$$

with:

$$X = \frac{\log\left(\frac{Ta}{100}\right)}{\log 2}$$

Ta may take the end-to-end delay into consideration, but also may include various delays that may be incurred at the network component if transcoding is required (i.e., if the codecs are different). Among the most important forms of delay that may be accounted for are:

Processing delay and Algorithmic Delay: the time taken by a digital signal processor (DSP) to compress the analog signal. Some codecs also require knowledge of future voice samples; this is the look ahead and is referred to as algorithmic delay. Table 1 presents some typical delay characteristics for some commonly used codecs. Table 1 should be considered with care as a network component doing IP to IP transcoding may encounter much lower delay if packets are processed as they are received, thereby limiting the overall added delay to the algorithmic delay plus a minimal delay associated with DSP processing. Delay may vary from one implementation to another and the decision algorithm may consider what the impact on delay is, based on network component implementation. Whenever a codec combination requires transcoding, Ta for both codecs may include processing and algorithmic delay.

Packetization delay: In a network component located between two IP networks this delay may generally not be encountered, excluding cases when the packetization time (ptime) on both network sides are different, which may require buffering. A network component interfacing IP-TDM may experience packetization delay. This type of delay, if experienced, may be taken into account by Ta.

De-Jitter delay: As for packetization delay, de-jitter delay would not usually be a problem in an IP-IP implementation that triggers transcoding as real-time transport protocol (RTP) packets are received. Some implementations may yet rely on a jitter buffer or may face a TDM interface. In such cases, a model estimating the effect of jitter on the jitter buffer delay may be used and the result added to Ta.

TABLE 1

Various codecs' characteristics

| Codec | Rate (Kb/s) | Frame Size (IP packet) (ms) | Look-ahead (ms) | End user implementation delay estimate (ms)** | R-factor*** |
|---|---|---|---|---|---|
| G.711 | 64 | 10, 20* | 0 | 0.125 | 93 |
| GSM-EFR | 12.2 | 20 | 0 | 40 | 89 |
| AMR-12.2 | 12.2 | 20 | 0 | 40 | 89 |
| AMR-6.7 | 6.7 | 20 | 0 | 40 | 71 |
| EVRC | 8 | 20 | 10 | 50 | 88 |
| G.726 (32k) | 32 | 10, 20* | 0 | 0.250 | 87 |
| G.729 | 8 | 10 | 5 | 25 | 83 |
| G.729A | 8 | 10 | 5 | 25 | 83 |
| G.723.1 (5.3k) | 5.3 | 30 | 7.5 | 67.5 | 75 |

*Waveform (sample based) codecs which do not require specific frame sizes, these numbers reflect typical packetization delays.
**The total delay for an ordinary implementation of the codec on a DSP, based on twice the frame size plus the "look-ahead"; assumes one frame per packet. In an IP-IP network component the processing delay can be drastically reduced if packets are processed as they are received (limiting it to the algorithmic delay plus some DSP processing). This table is for illustrative purposes only and specific implementations will vary.
***Score obtained in perfect conditions (i.e., no packet loss, no noise, no delay, etc.) so this is the best possible score for the codec.

An R-factor may be calculated for every codec combination that a network component may offer its endpoints in a given communication session. For example, an R-factor may be calculated for every codec combination that transcoder node 116 may offer to UE 102 and/or UE 104. An R-factor may be computed by calculating both Ie and Id for each codec using substantially current network conditions. For example, an R-factor may be computed for every codec combination transcoder node 116 may offer UE 102 and UE 104 by transcoder node 116's codec selection module 206 calculating both Ie and Id for each codec compatible with UE 102 and/or UE 104 using substantially current network conditions associated with access network 106 and/or access network 108. An R-factor for each codec combination $R_c$ may then be computed by entering the calculated Ie and Id for each codec (e.g., $Ie_{codec-a}$; $Id_{codec-a}$; $Ie_{codec-b}$; and $Id_{codec-b}$) into the following formula:

$$R_c = 93.2 - Id_{codec-a} - Ie_{codec-a} - Id_{codec-b} - Ie_{codec-b}$$

The following table illustrates the type of results (i.e., R-factors) that might be obtained under near perfect conditions:

TABLE 2

Exemplary R-factors under near perfect conditions

| | | Codec 2 (e.g., codecs compatible with UE 104) | | | | |
|---|---|---|---|---|---|---|
| FROM/TO | | G.711 | AMR 12.2 | EVRC | G.729 | G.729 (WO VAD) |
| Codec 1 (e.g., codecs compatible with UE 102) | G.711 | 93* | 88 | 87 | 83 | 82 |
| | AMR 12.2 | 88 | 88* | 82 | 78 | 77 |
| | EVRC | 87 | 82 | 87* | 77 | 76 |
| | G.729 | 83 | 78 | 77 | 83* | 72 |
| | G.729 (WO VAD) | 82 | 77 | 76 | 72 | 82* |

*No transcoding (i.e., TFO).

As Table 2 illustrates, an R-factor may be calculated for each codec combination. This will result in a total of N*M R-factors, where N is the total number of codecs compatible with the first endpoint (e.g., UE 102) and M is the total number of codecs compatible with the second endpoint (e.g., UE 104). A codec combination may be selected by choosing the combination with the greatest R-factor value.

In some embodiments, the codec selection model may take one or more factor(s) other than voice quality into account. For example, the codec selection model may take bandwidth and/or least cost routing into account. In some embodiments, the codec selection model may assign a weight to each of multiple factors, taking each of the factors into account to the extent of its weight. In such embodiments, the following formula may be utilized:

$$Dc = \sum_{n=0}^{N-1} w(n) \cdot s(n)$$

Where:
N: corresponds to the total number of factors
Dc: corresponds to the decision factor for combination c (the higher the factor the better the combination)
w(n): corresponds to the weight given each factor (for example, the sum of all weights may total to 1.0)

$$\sum_{n=0}^{N-1} w(n) = 1$$

s(n): corresponds to the prorated quantitative value of factor n, using the best possible result (BR) in all combinations considered as the basis for comparison to the current combination (CR), and brought back on a scale of 100
If BR≥CR:

$$s(n) = \left(\frac{CR}{BR}\right) \times 100$$

If CR>BR:

$$s(n) = \left(\frac{BR}{CR}\right) \times 100$$

For example:
If bandwidth usage and voice quality are both weighted at fifty percent.
For codec combination 1 ($c_1$):
  R-factor=90
  Average bandwidth usage=64K
For codec combination 2 ($c_2$):
  R-factor=80
  Average bandwidth usage=10K
In both cases w(1)=0.5 and w(2)=0.5
For codec combination 1 ($c_1$):

$$s(1) = \left(\frac{10}{64}\right) \times 100 = 15.7$$

$$s(2) = \left(\frac{90}{90}\right) \times 100 = 100$$

$$Dc_1 = 57.85$$

For codec combination 2 ($c_2$):

$$s(1) = \left(\frac{10}{10}\right) \times 100 = 100$$

$$s(2) = \left(\frac{80}{90}\right) \times 100 = 88$$

$$Dc_2 = 94.0$$

Thus, codec combination 2 may be favored.

Figure 3:
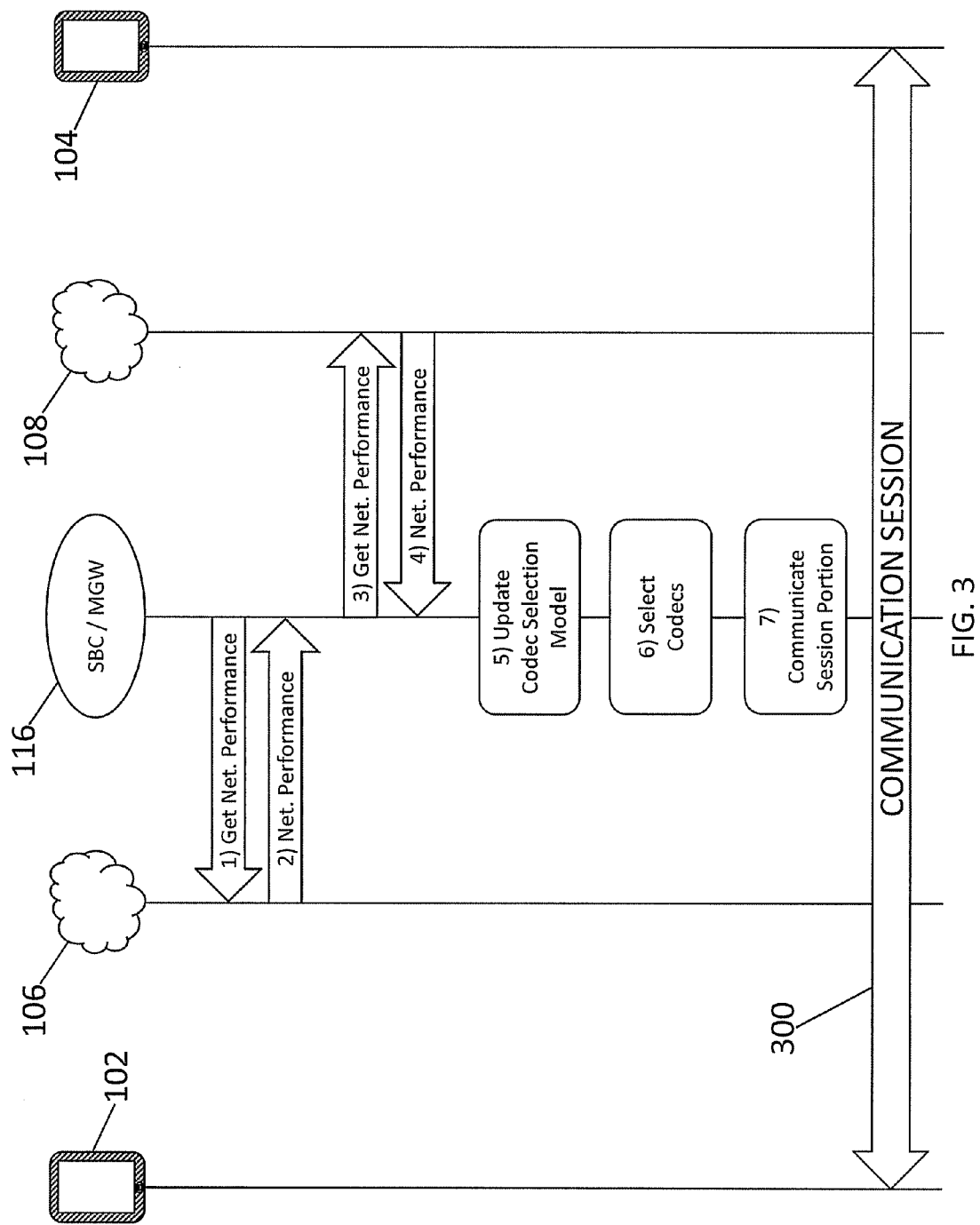
FIG. 3 is a flow diagram illustrating an exemplary sequence for selecting a codec pair based on network conditions in accordance with embodiments of the subject matter described herein.

FIG. 3 is a flow diagram illustrating an exemplary sequence for selecting a codec pair based on network conditions in accordance with embodiments of the subject matter described herein. Referring to FIG. 3, communication session 300 may exist or may be in the process of being setup between UE 102 and UE 104. UE 102 and UE 104 may not both utilize a common codec, or one or more intervening network node(s) between UE 102 and UE 104 may not be compatible with a codec utilized by one or both of UE 102 and UE 104, and thus transcoding of a portion of communication session 300 may be required. In accordance with embodiments of the subject matter described herein, the codecs utilized may be selected based on network conditions, for example, network conditions in one or more of access network 106 and access network 108. At step 1, transcoder node 116's network performance module 204 may request a performance metric from a network probe located in access network 106. At step 2, the network probe located in access network 106 may respond with the requested performance metric. At step 3, transcoder node 116's network performance module 204 may request a performance metric from a network probe located in access network 108. At step 4, the network probe located in access network 108 may respond with the requested performance metric. At step 5, transcoder node 116's codec selection module 206 may generate and/or update a codec selection model based on the performance metric obtained from the network probe located in access network 106 and the performance metric obtained from the network probe located in access network 108. At step 6, transcoder node 116's codec selection module 206 may select, based on the codec selection model, a first codec compatible with UE 102 and a second codec compatible with UE 104. At step 7, transcoder node 116's transcoder 208 may utilize the first selected codec (e.g., a codec compatible with UE 102) and the second selected codec (e.g., a codec compatible with UE 104) to communicate a portion of communication session 300 between UE 102 and UE 104. For example, if the first selected codec and the second selected codec are the same, transcoder node 116's transcoder 208 may communicate a portion of communication session 300 by supporting TFO for the portion of communication session 300. On the other hand, if the first selected codec and the second selected codec are different, transcoder node 116's transcoder 208 may communicate a portion of communication session 300 by transcoding the portion from the first selected codec (e.g., the selected codec compatible with UE 102) to the second selected codec (e.g., the selected codec compatible with UE 104).

In some embodiments, transcoder node 116 may perform codec selection based on network conditions, as represented by the codec selection model, only once when communication session 300 is setup. In other embodiments, transcoder node 116 may perform codec selection based on network conditions, as represented by the codec selection model, at setup and/or periodically, updating the selected codecs based on potentially changing network conditions. In some embodiments, transcoder node 116 may update the codec selection model and/or select a new codec combination periodically at predefined intervals (e.g., every 30 seconds). In some embodiments, transcoder node 116 may update the codec selection model and/or select a new codec combination based on a hysteresis loop so that a transition will occur only when a different codec combination would increase QoS by a predefined margin (e.g., five percent), thereby reducing potentially constant transitions that might interfere with overall QoS. In some embodiments, codec renegotiation may be performed by ordering the codecs specified in SDP messages by their corresponding R-factor values. In some embodiments, codec negotiation/renegotiation may be performed in accordance with RFC 5939 (September 2010).

Figure 4A:
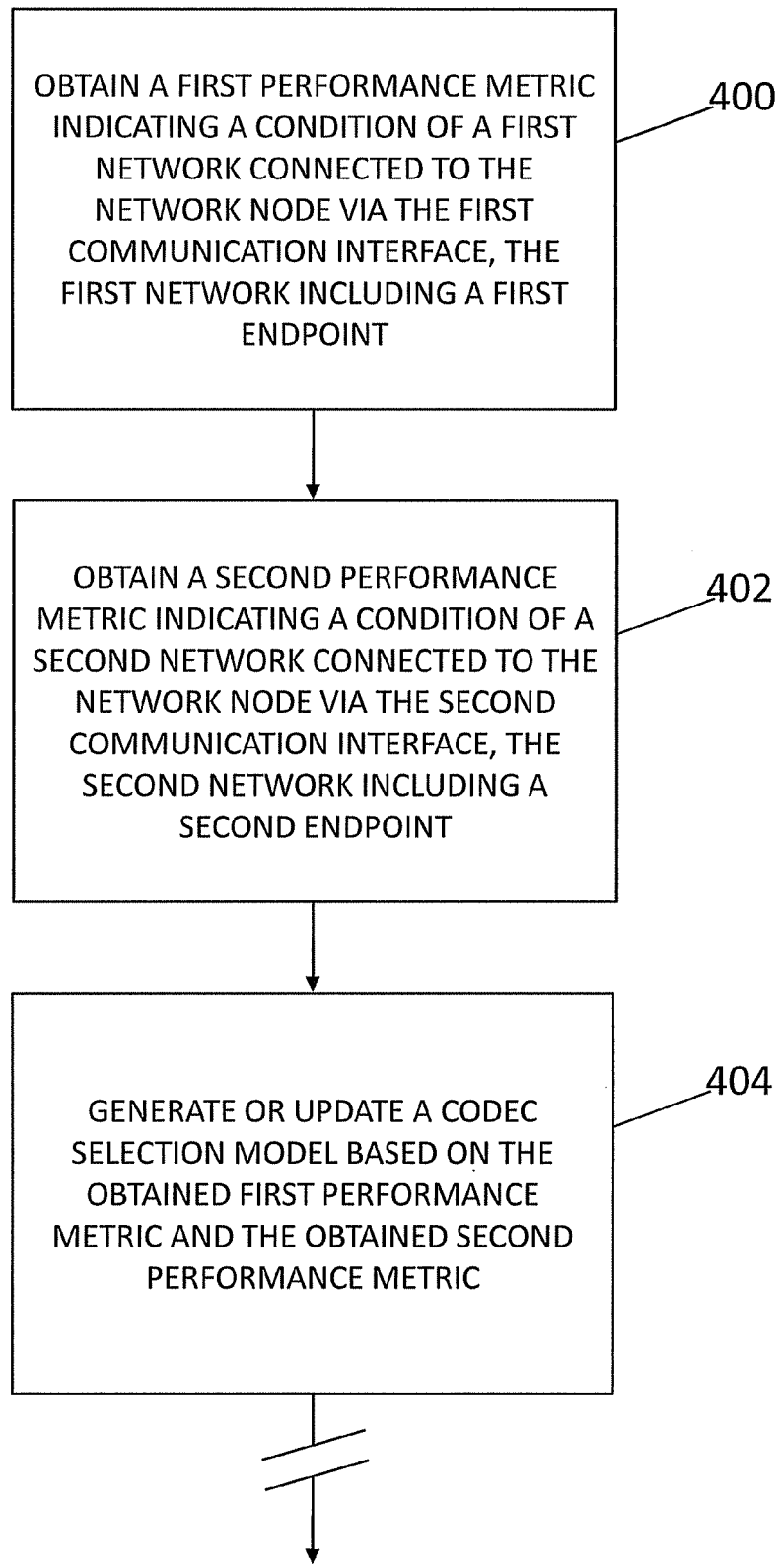
FIGS. 4A and 4B are respectively a first and second portion of a flow chart illustrating an exemplary process for selecting a codec pair based on network conditions in accordance with embodiments of the subject matter described herein.
Figure 4B:
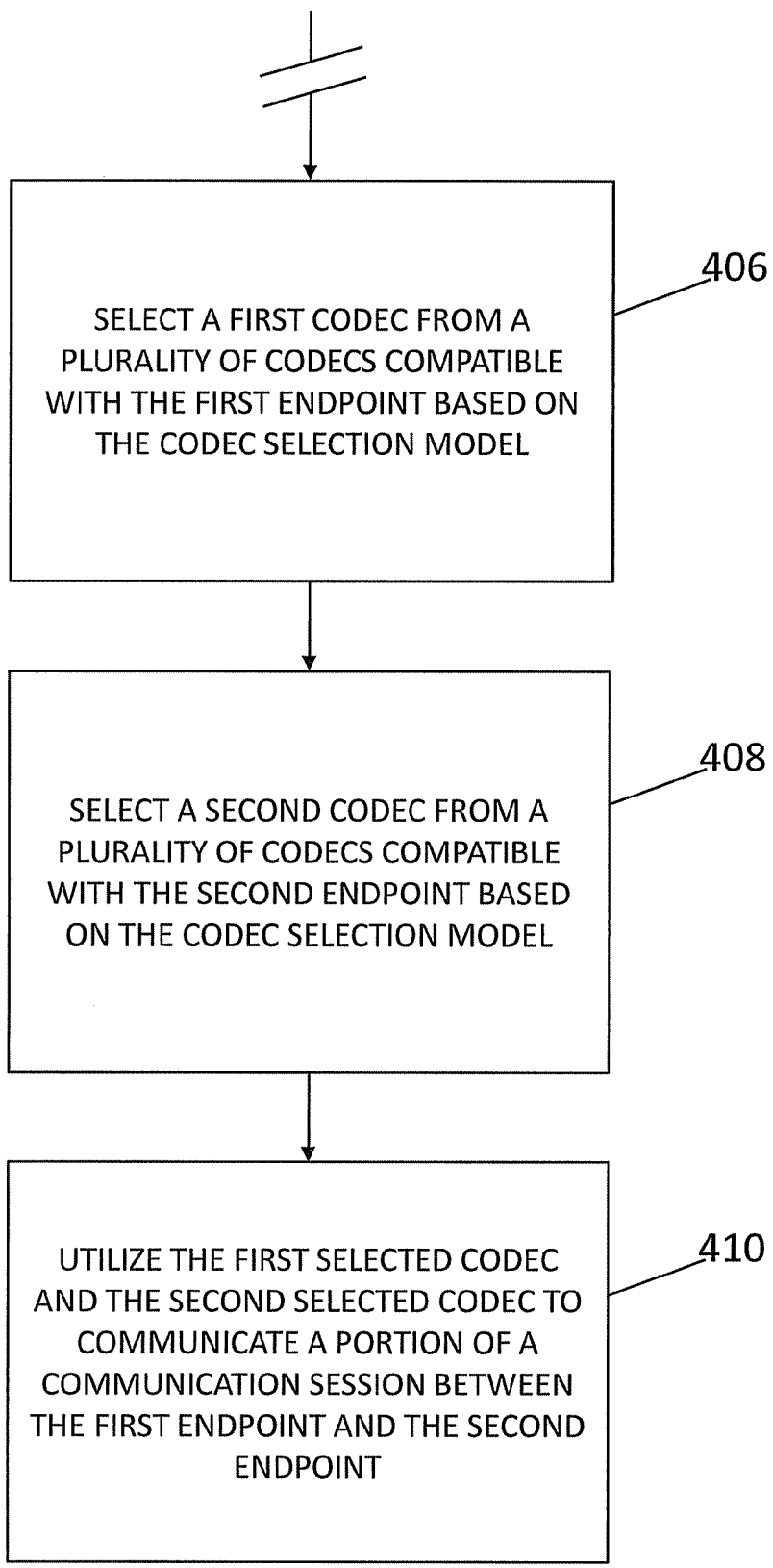

FIGS. 4A and 4B are respectively a first and second portion of a flow chart illustrating an exemplary process for selecting a codec pair based on network conditions in accordance with embodiments of the subject matter described herein. The steps may be performed at a network node including a first communication interface and a second communication interface. For example, the steps may be performed at transcoder node 116 which may include communication interface 200 and communication interface 202. Referring to FIG. 4A, in step 400, a first performance metric indicating a condition of a first network connected to the network node via the first communication interface is obtained, the first network including a first endpoint. For example, transcoder node 116's network performance module 204 may obtain a first performance metric indicating a condition of access network 106. Access network 106 may include a first endpoint (e.g., UE 102) and may be connected to transcoder node 116 via communication interface 200. In step 402, a second performance metric indicating a condition of a second network connected to the network node via the second communication interface is obtained, the second network including a second endpoint. For example, transcoder node 116's network performance module 204 may obtain a second performance metric indicating a condition of access network 108. Access network 108 may include a second endpoint (e.g., UE 104) and may be connected to transcoder node 116 via communication interface 202. In step 404 a codec selection model is generated or updated based on the obtained first performance metric and the obtained second performance metric. For example, transcoder node 116's codec selection module 206 may generate or update a codec selection model based on the obtained first performance metric indicating a condition of access network 106 and the obtained second performance metric indicating a condition of access network 108. Referring to FIG. 4B, in step 406, a first codec is selected from a plurality of codecs compatible with the first endpoint based on the codec selection model. For example, transcoder node 116's codec selection module 206 may select a codec from a plurality of codecs compatible with UE 102 based on the codec selection model. In step 408, a second codec is selected from a plurality of codecs compatible with the second endpoint based on the codec selection model. For example, transcoder node 116's codec selection module 206 may select a codec from a plurality of codecs compatible with UE 104 based on the codec selection model. In step 410, the first selected codec and the second selected codec are utilized to communicate a portion of a communication session between the first endpoint and the second endpoint. For example, a portion of communication session 300 between UE 102 and UE 104 may be transcoded by transcoder node 116's transcoder 208 from the first selected codec to the second selected codec.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for selecting a codec pair based on network conditions, the method comprising:
    at a network node including a first communication interface and a second communication interface:
        obtaining a first performance metric indicating a condition of a first network connected to the network node via the first communication interface, the first network including a first endpoint;
        obtaining a second performance metric indicating a condition of a second network connected to the network node via the second communication interface, the second network including a second endpoint;
        modifying a first impairment value for the first network connection according to the first performance metric;
        modifying a second impairment value for the second network connection according to the second performance metric;
        generating or updating a codec selection model based on at least one of processing delay, algorithmic delay, and buffering delay and based on the first impairment value modified by the obtained first performance metric and the second impairment value modified by the obtained second performance metric;

selecting a first codec from a plurality of codecs compatible with the first endpoint based on the codec selection model;

selecting a second codec from a plurality of codecs compatible with the second endpoint based on the codec selection model; and utilizing the first selected codec and the second selected codec to communicate a portion of a communication session between the first endpoint and the second endpoint.

2. A method for selecting a codec pair based on network conditions, the method comprising:

at a network node including a first communication interface and a second communication interface:

obtaining a first performance metric indicating a condition of a first network connected to the network node via the first communication interface, the first network including a first endpoint;

obtaining a second performance metric indicating a condition of a second network connected to the network node via the second communication interface, the second network including a second endpoint;

modifying a first impairment value for the first network connection according to the first performance metric;

modifying a second impairment value for the second network connection according to the second performance metric;

generating or updating a codec selection model based on the first impairment value modified by the obtained first performance metric and the second impairment value modified by the obtained second performance metric and based on a plurality of factors, at least one of the factors corresponding to available bandwidth or least cost routing, each of the factors assigned a weight and generating or updating the codec selection model includes taking into account each of the factors to the extent of its assigned weight;

selecting a first codec from a plurality of codecs compatible with the first endpoint based on the codec selection model;

selecting a second codec from a plurality of codecs compatible with the second endpoint based on the codec selection model; and utilizing the first selected codec and the second selected codec to communicate a portion of a communication session between the first endpoint and the second endpoint.

3. The method of claim 1 wherein generating or updating the codec selection model includes computing a scalar value that corresponds to conversation quality for each combination of the plurality of codecs compatible with the first endpoint and the plurality of codecs compatible with the second endpoint.

4. The method of claim 1 wherein at least one of the first performance metric and the second performance metric corresponds to at least one of a measure of packet loss, a measure of end-to-end packet delay, and a measure of jitter.

5. The method of claim 1 wherein at least one of the plurality of codecs compatible with the first endpoint and the plurality of codecs compatible with the second endpoint is obtained as part of a session description protocol (SDP) offer message.

6. The method of claim 1 wherein the first communication interface is a packet interface and the second communication interface is a packet interface.

7. The method of claim 1 wherein the first communication interface is a packet interface and the second communication interface is a time-division multiplexing (TDM) interface.

8. The method of claim 1 wherein the network node comprises at least one of a session border controller (SBC) and a media gateway.

9. The method of claim 1 wherein the first selected codec and the second selected codec are different; and wherein utilizing the first selected codec and the second selected codec to communicate the portion of the communication session between the first endpoint and the second endpoint comprises transcoding, from the first selected codec to the second selected codec, the portion of the communication session between the first endpoint and the second endpoint.

10. The method of claim 1 wherein the first selected codec and the second selected codec are the same, and wherein utilizing the first selected codec and the second selected codec to communicate the portion of the communication session between the first endpoint and the second endpoint comprises supporting tandem free operation (TFO) for the portion of the communication session between the first endpoint and the second endpoint.

11. A system for selecting a codec pair based on network conditions, the system comprising:

a first communication interface configured to interface with a first network including a first endpoint;

a second communication interface configured to interface with a second network including a second endpoint;

a network performance module configured to obtain a first performance metric indicating a condition of the first network and a second performance metric indicating a condition of the second network;

a codec selection module configured to generate a codec selection model based on the obtained first performance metric and the obtained second performance metric, select a first codec from a plurality of codecs compatible with the first endpoint based on the codec selection model, and select a second codec from a plurality of codecs compatible with the second endpoint based on the codec selection model, and update the codec selection model during a call in response to a change in the first performance metric or the second performance metric during the call; and a transcoder configured to utilize the first selected codec and the second selected codec to communicate a portion of a communication session between the first endpoint and the second endpoint.

12. The system of claim 11 wherein the codec selection module is configured to generate or update the codec selection model by computing a scalar value that corresponds to conversation quality for each combination of the plurality of codecs compatible with the first endpoint and the plurality of codecs compatible with the second endpoint.

13. The system of claim 11 wherein the codec selection model is based on at least one of processing delay, algorithmic delay, and buffering delay.

14. The system of claim 11 wherein the codec selection model is based on a plurality of factors, at least one of the factors corresponding to available bandwidth or least cost routing.

15. The system of claim 14 wherein each of the factors is assigned a weight and wherein the codec selection module is configured to generate or update the codec selection model by taking into account each of the factors to the extent of its assigned weight.

16. The system of claim 11 wherein at least one of the first performance metric and the second performance metric corresponds to at least one of a measure of packet loss, a measure of end-to-end packet delay, and a measure of jitter.

17. The system of claim 11 wherein at least one of the plurality of codecs compatible with the first endpoint and the plurality of codecs compatible with the second endpoint is obtained as part of a session description protocol (SDP) offer message.

18. The system of claim 11 wherein the first communication interface is a packet interface and the second communication interface is a packet interface.

19. The system of claim 11 wherein the first communication interface is a packet interface and the second communication interface is a time-division multiplexing (TDM) interface.

20. The system of claim 11 wherein the memory, the first communication interface, the second communication interface, the network performance module, the codec selection module, and the transcoder comprise a network node, and wherein the network node comprises at least one of a session border controller (SBC) and a media gateway.

21. The system of claim 11 wherein the first selected codec and the second selected codec are different; and
   wherein the transcoder is configured to transcode, from the first selected codec to the second selected codec, the portion of the communication session between the first endpoint and the second endpoint.

22. The system of claim 11 wherein the first selected codec and the second selected codec are the same, and wherein the transcoder is configured to support tandem free operation (TFO) for the portion of the communication session between the first endpoint and the second endpoint.

23. A method for selecting a codec pair based on network conditions, the method comprising:
   at a network node including a first communication interface and a second communication interface:
   obtaining a first performance metric indicating a condition of a first network connected to the network node via the first communication interface, the first network including a first endpoint;
   obtaining a second performance metric indicating a condition of a second network connected to the network node via the second communication interface, the second network including a second endpoint;
   modifying a first impairment value for the first network connection according to the first performance metric;
   modifying a second impairment value for the second network connection according to the second performance metric;
   generating or updating a codec selection model based on the first impairment value modified by the obtained first performance metric and the second impairment value modified by the obtained second performance metric;
   selecting a first codec from a plurality of codecs compatible with the first endpoint based on the codec selection model;
   selecting a second codec from a plurality of codecs compatible with the second endpoint based on the codec selection model;
   utilizing the first selected codec and the second selected codec to communicate a portion of a communication session between the first endpoint and the second endpoint; and
   updating the codec selection model during a call, in response to a change in the first impairment value or the second impairment value.

* * * * *